UNITED STATES PATENT OFFICE.

FRED O. PAIGE, OF NEW YORK, N. Y., ASSIGNOR TO PAIGE & JONES CHEMICAL COMPANY, INC., OF NEW YORK, N. Y.

ZINC COMPOUND.

1,260,987.  Specification of Letters Patent.  Patented Mar. 26, 1918.

No Drawing.  Application filed July 31, 1917. Serial No. 183,720.

*To all whom it may concern:*

Be it known that I, FRED O. PAIGE, a citizen of the United States, residing at New York, in the county and State of New York, have invented certain new and useful Improvements in Zinc Compounds, of which the following is a full, clear, and exact specification.

This invention relates to zinc compounds for boiler feed water treatment.

Zinc in the shape of zinc plate has been used in boilers for many years for the purpose of overcoming galvanic action. It has been hung in baskets, on hangers, and bolted to studs, thus making at the best a local application of the zinc. It is a well known fact, however, that only a small percentage of efficiency can be attained from the use of zinc plates, as they soon become oxidized.

This invention contemplates the use of a zinc compound as a feed water treatment for removing scale, oil and grease and preventing pitting, corrosion and galvanic action, thus doing away with the use of zinc plates without cutting lubrication, injuring packing or causing boilers to prime or foam.

The preferred proportions of ingredients are as follows:

| | |
|---|---|
| Zinc dust | 6% |
| Soda ash | 48% |
| Bark extract | 18% |
| Dextrin | 10% |
| Graphite | 4% |
| Water | 14% |

These ingredients are thoroughly mixed in powdered form or bound together in solid form in the shape of a brick, ball or stick. The various ingredients may be increased or decreased, according to water conditions, and other ingredients may be added, if necessary, such as carbo-hydrate in the shape of dextrin, starch or flour, tri-sodium phosphate, silicate of soda, barium hydrate or barium chlorid, also vegetable and mineral oils.

By combining pure zinc, in the shape of zinc dust, in brick, ball or stick form, substantially in accordance with the above formula, the resulting compounds may be dissolved in a filter box, hot well, or some other proper feeding device, so as to distribute the zinc throughout the boiler feed water, thus neutralizing the galvanic action before the water enters the boiler. The compound put up in this shape will keep indefinitely without degeneration or deterioration, and can be shipped long distances, so that it is especially suitable for ships engaged in ocean traffic.

About one pound of the compound is used for each 300 H. P. developed, and is generally sufficient to remove the scale already formed and to prevent the formation of new scale, to prevent galvanic action, pitting and corrosion, and to remove all grease and oil without injury to the packing, engines or boilers, and without causing the boilers to foam or prime. The scale-forming salts in the water are kept in a soft sludge or mud which can be easily blown out or washed out from time to time when the boilers are open.

It is understood that this invention is not limited to the exact proportions above mentioned, as these will vary according to the nature of the water to be treated.

Having thus described my invention, what I claim as new and desire to secure by Letters Patent of the United States is:

1. A zinc compound, for boiler feed water treatment, consisting of zinc dust, vegetable acid, alkali salts and carbo-hydrates.

2. A zinc compound, for boiler feed water treatment, consisting of zinc dust, soda ash, bark extract, dextrin, graphite and water.

3. A zinc compound, for boiler feed water treatment, consisting of the following ingredients in substantially the proportions given, viz: zinc dust 6%, soda ash 48%, bark extract 18%, dextrin 10%, graphite 4% and water 14%.

4. The process of forming a zinc compound, for boiler feed water treatment, which consists in thoroughly mixing zinc dust, vegetable acid, alkali salts and carbo-hydrates, to form a hard mass in the shape of a brick, ball or stick.

5. The process of forming a zinc compound, for boiler feed water treatment, which consists in thoroughly mixing zinc dust, vegetable acid, alkali salts and carbo-hydrates, all dry or semi-liquid, to form a hard mass in the shape of a brick, ball or stick.

In testimony whereof I have signed my name to this specification.

FRED O. PAIGE.